T. M. Sheppard,
Sieve.
№ 51,871.            Patented Jan. 2, 1866.
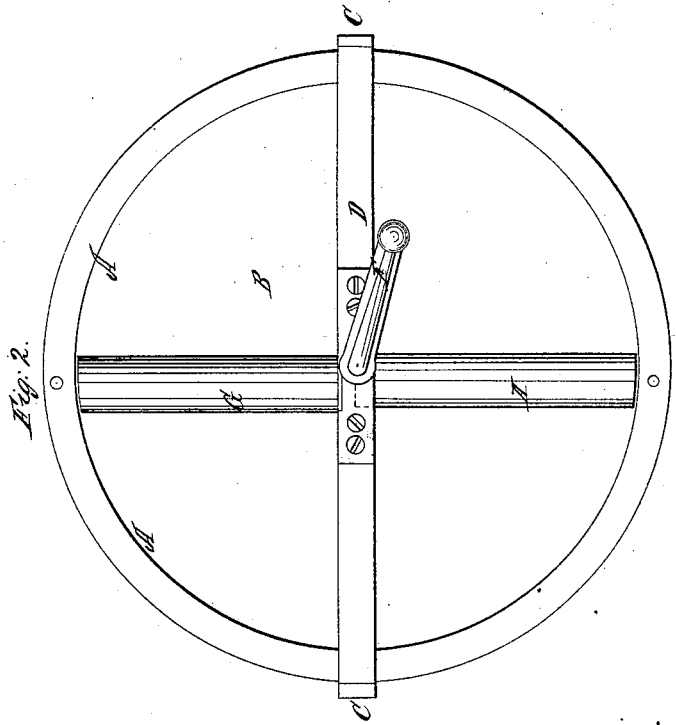
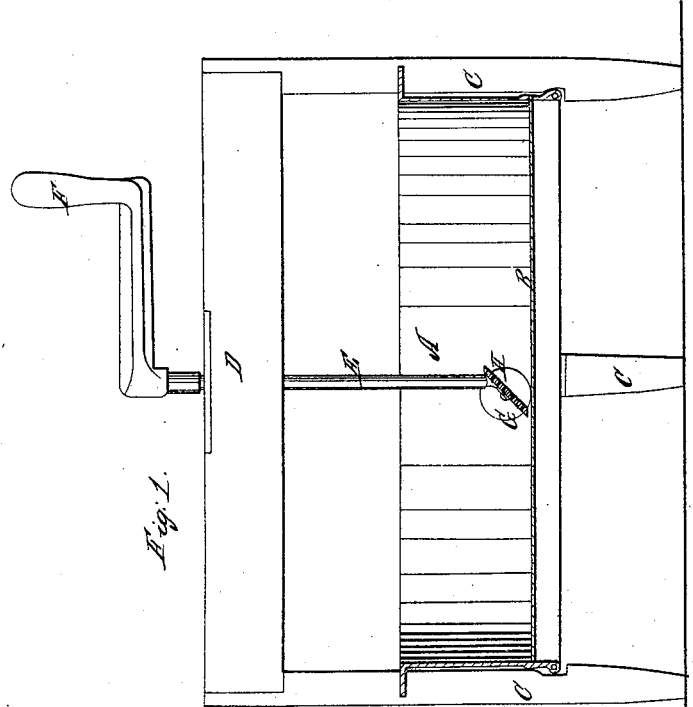
Witnesses:
W. C. Dauber
R. C. Bolton
Inventor:
T. M. Sheppard
by Coburn & Mans
Attorneys

UNITED STATES PATENT OFFICE.

THOMAS M. SHEPPARD, OF CHICAGO, ILLINOIS.

SIEVE.

Specification forming part of Letters Patent No. 51,871, dated January 2, 1866.

*To all whom it may concern:*

Be it known that I, THOMAS M. SHEPPARD, of Chicago, in the county of Cook and State of Illinois, have invented a new and useful Improvement in Sieves; and I do hereby declare that the following is a full, clear, and exact description of the same, reference being had to the accompanying drawings and the letters and figures marked thereon, which form part of this specification.

The nature of my said invention consists in the employment, in combination with a sieve for sifting and separating the finer from the coarser parts of flour and other analogous substances, of a roller and an inclined metallic scraper moving around upon the bottom of said sieve, the roller crushing and forcing the finer parts through the sieve, while the scraper, following after, loosens up and frees the flour from the sieve and opens the perforations or interstices in the bottom thereof.

To enable those skilled in the art to construct and use my invention, I will proceed to describe the same with particularity, making reference in so doing to the aforesaid drawings, in which—

Figure 1 represents a central vertical section, and Fig. 2 a plan or top view of the same.

A represents the circular hoop forming the side of the sieve, and B the perforated or wire-gauze bottom of the same, the sieve being supported upon the standards C, to the upper ends of two of which the cross-bar D is secured, as shown, in which the vertical shaft E has its bearings, in which it is turned by means of the crank F.

At the lower end of the shaft E are attached two horizontal arms, lying just above the bottom of the sieve, one of which forms an axle upon which the roller G revolves, and the other forms an inclined knife or scraper, its edge lying just above and close to the bottom of the sieve, as shown in the drawings.

The flour or other material to be sifted is placed in the sieve and the crank F turned, moving the roller and the scraper around upon the perforated bottom B, the roller pressing such particles as are small enough down through the interstices of the sieve, while the scraper, following after, loosens up the flour packed into the said interstices and opens them for the return of the roller.

Having described the construction and operation of my invention, I will specify what I claim therein and desire to secure by Letters Patent—

In combination with a sieve, A B, the employment of the roller G, the scraper H, shaft E, and crank F, all arranged and operating as and for the purposes herein specified and shown.

T. M. SHEPPARD.

Witnesses:
W. E. MARRS,
J. AUGUSTINE.